United States Patent [19]

Rusnak

[11] Patent Number: 5,336,996

[45] Date of Patent: Aug. 9, 1994

[54] HALL EFFECT MONITORING OF WEAR OF BEARING SUPPORTING A ROTOR WITHIN A STATIONARY HOUSING

[75] Inventor: Dennis M. Rusnak, Miamisburg, Ohio

[73] Assignee: The Duriron Company, Inc., Dayton, Ohio

[21] Appl. No.: 933,336

[22] Filed: Aug. 21, 1992

[51] Int. Cl.⁵ ............... G01B 7/14; F04B 51/00; G01M 13/04; G01P 3/487

[52] U.S. Cl. .................... 324/207.2; 73/660; 324/165; 324/174; 324/207.23; 324/207.24; 324/207.25; 340/682; 417/63

[58] Field of Search ........... 324/158 MG, 207.11, 324/207.2, 207.21, 207.23, 207.24, 207.25, 165, 174; 73/457, 462, 660, 661; 340/682, 683, 686; 417/63; 384/448

[56] References Cited

U.S. PATENT DOCUMENTS

| | | |
|---|---|---|
| 2,805,677 | 9/1957 | Baird . |
| 3,152,261 | 10/1964 | Carlstein ............ 324/207.2 X |
| 3,162,804 | 12/1964 | Parsons ............ 324/207.2 X |
| 3,193,784 | 7/1965 | Lautzenhiser . |
| 3,194,990 | 7/1965 | Kendall . |
| 3,381,216 | 4/1968 | Sibley, Jr. et al. . |
| 3,743,934 | 7/1973 | Risch ............ 324/226 X |
| 3,981,621 | 9/1976 | Considine . |
| 4,199,718 | 4/1980 | Ikeda et al. . |
| 4,518,918 | 5/1985 | Avery ............ 324/207.2 |
| 4,555,120 | 11/1985 | Frait et al. ............ 324/207.2 |
| 4,644,270 | 2/1987 | Oates et al. ............ 324/207.25 |
| 4,655,361 | 5/1987 | Dorsch et al. . |
| 4,732,494 | 3/1988 | Griers et al. . |
| 4,897,603 | 1/1990 | Bieber et al. ............ 324/207.2 |
| 4,924,180 | 5/1990 | Nasr et al. ............ 324/207.15 |

FOREIGN PATENT DOCUMENTS

| | | | |
|---|---|---|---|
| 0050304 | 3/1984 | Japan | 324/207.23 |
| 2248115 | 3/1992 | United Kingdom . | |

OTHER PUBLICATIONS

Insight TM; Copy of Brochure from The Kontro Company, Inc., published in Mar. 1991 Issue of *World Pumps*.

"HMD Seal/Less Pumps-Forging a Path"; Article published in Mar. 1991 Issue of *Chemical Engineering*.

"Pump Monitoring in a State of Flux", *Process Engineering*, p. 53, Jul. 1991.

*Primary Examiner*—Gerard R. Strecker
*Attorney, Agent, or Firm*—Killworth, Gottman, Hagan & Schaeff

[57] ABSTRACT

An apparatus is provided for monitoring a rotor mounted for rotation by bearings within a stationary housing of an apparatus, such as a sealless pump. In a first embodiment, the monitoring apparatus includes at least one magnet mounted on the circumference of the rotor and a plurality of hall effect devices which sense magnetic flux density as the rotor rotates to generate signals representative of radial and axial bearing wear as well as signals representative of the direction of rotation of the rotor. In a further embodiment, the monitoring apparatus includes magnetic material mounted in one or more locations around the rotor or entirely around the rotor and a plurality of hall effect devices and associated magnets mounted within the stationary housing and surrounding the rotor. The monitoring apparatus further includes a monitor for monitoring the amount of electrical power driving the pump as well as a monitor for monitoring the temperature of a containment shell which encloses the rotor within the sealless pump.

16 Claims, 8 Drawing Sheets

HALL EFFECT MONITORING OF WEAR OF BEARING SUPPORTING A ROTOR WITHIN A STATIONARY HOUSING

BACKGROUND OF THE INVENTION

The present invention relates generally to an apparatus for monitoring a rotor mounted by bearings within a stationary housing and, more particularly, to such an apparatus which provides an indication of radial and axial wear of the bearings and provides an indication of whether the rotor is rotating and, if so, its direction and speed of rotation. While the present invention is generally applicable to rotary machines, it is particularly applicable to sealless rotor pumps and accordingly will be described herein with reference to this application.

Sealless rotor pumps are known in the prior art and are commonly used in the nuclear and chemical fields. Such pumps normally include a rotor having a shaft mounted for rotation by bearings within a stationary housing. A containment shell is provided within the housing for enclosing the rotor and forming a portion of a sealed chamber through which fluid passes as it is circulated by the pump. The bearings and the rotor shaft are contained within the containment shell and are immersed in the fluid being pumped, which is often of a corrosive nature. As a result, the rotor shaft and/or the bearings may wear rapidly, making it difficult to predict when the bearings and/or the shaft must be replaced. If excessive bearing or shaft wear occurs and is not repaired, the containment shell may be damaged by the rotor risking rupture of the shell and leakage of fluid from the pump.

Numerous devices have been proposed to provide a warning of bearing or shaft wear. For example, in U.S. Pat. No. 4,924,180 a detection device is disclosed which serves to measure bearing or shaft wear in a pump. The device includes a plurality of magnets which are positioned about the outer circumference of the rotating shaft of the pump. Surrounding the rotating shaft is a stationary collar which houses at least two coils. The two coils are positioned substantially diametrically opposite to one another and sense magnetic flux density as the shaft rotates to generate first and second voltage signals. A differential amplifier is provided which compares the first and second voltage signals to one another to generate a third signal. The third signal is then compared to a reference signal which is proportional to shaft speed to obtain a compensated third signal representative of shaft or bearing wear.

A limitation of the device disclosed in the referenced patent is that the flux density sensors, i.e., the coils, are not capable of generating flux density signals which are independent of shaft speed. Consequently, a reference signal must be generated to compensate for the effect of shaft speed before a signal can be obtained which is representative of shaft or bearing wear. Furthermore, the device is not capable of monitoring axial bearing wear, the direction of rotation of the shaft, the amount of electrical power driving the pump, and temperatures within the pump.

Accordingly, there is a need for an improved monitoring device for a sealless pump which is capable of monitoring shaft or bearing wear independent of shaft speed. Preferably, such an improved monitoring device would also be capable of monitoring axial bearing wear, whether the shaft is rotating, and if so, the direction and speed of rotation of the shaft, the amount of electrical power driving the pump, and at least one temperature within the pump, all to the end of improving performance and reliability of the sealless pump.

SUMMARY OF THE INVENTION

This need is met by the present invention wherein an apparatus is provided for monitoring a rotor mounted for rotation by bearings within a stationary housing of an apparatus, such as a sealless pump. In a first embodiment, the monitoring apparatus includes at least one magnet mounted on the circumference of the rotor and a plurality of hall effect devices which sense magnetic flux density as the rotor rotates to generate signals representative of radial and axial bearing wear as well as signals representative of whether the rotor is rotating and, if so, the direction and speed of rotation of the rotor. In a further embodiment, the monitoring apparatus includes magnetic material mounted in one or more locations around the rotor or entirely around the rotor and a plurality of hall effect devices and associated magnets mounted within the stationary housing and surrounding the rotor. The monitoring apparatus may further include means for monitoring the amount of electrical power driving the pump as well as means for monitoring temperatures within the sealless pump.

In accordance with a first aspect of the present invention, an apparatus is provided for monitoring a rotor within a stationary housing. The stationary housing includes bearing means for mounting the rotor for rotation about a rotor axis. The monitoring apparatus includes at least one magnet mounted about the circumference of the rotor. First radial hall effect means is fixedly mounted in the housing adjacent to the rotor for sensing magnetic flux density as the at least one magnet passes thereby and for generating a first distance signal representative of the distance separating the first radial hall effect means and the rotor in response to the magnetic flux density. Second radial hall effect means is fixedly mounted in the housing adjacent to the rotor for sensing magnetic flux density as the at least one magnet passes thereby and for generating a second distance signal representative of the distance separating the second radial hall effect means and the rotor in response to the magnetic flux density. Signal comparison means is further provided for comparing the first and second distance signals to one another to generate a first comparison signal which is representative of the difference between the distance separating the first radial hall effect means and the rotor and the distance separating the second radial hall effect means and the rotor. The first comparison signal is representative of radial wear of the bearing means along a first axis which passes through the first and second radial hall effect means.

Preferably, the monitoring apparatus further comprises third radial hall effect means fixedly mounted in the housing adjacent to the rotor for sensing magnetic flux density as the at least one magnet passes thereby and for generating a third distance signal representative of the distance separating the third radial hall effect means and the rotor in response to the magnetic flux density. Fourth radial hall effect means is fixedly mounted in the housing adjacent to the rotor for sensing magnetic flux density as the at least one magnet passes thereby and for generating a fourth distance signal representative of the distance separating the fourth radial hall effect means and the rotor in response to the magnetic flux density. The signal comparison means further compares the third and fourth distance signals to one another to generate a second comparison signal which is representative of the difference between the distance separating the third radial hall effect means and the rotor and the distance separating the fourth radial hall effect means and the rotor. The second comparison signal is representative of radial wear of the bearing means along a second axis which passes through the third and fourth radial hall effect means.

In an illustrated embodiment, the first axis which passes through the first and second radial hall effect means and the second axis which passes through the third and fourth radial hall effect means are substantially perpendicular to one another and define a plane which is substantially perpendicular to the rotor axis. The first, second, third and fourth radial hall effect means are spaced substantially equidistantly about a circumferential portion of the housing. Preferably, the circumferential portion of the housing comprises a sensor ring which is coaxial with the rotor.

The signal comparison means further generates a resultant wear signal which is indicative of resultant radial wear of the bearing means. In an illustrative embodiment, the signal comparison means generates the resultant wear signal by taking the square root of the sum of the squares of the first and second comparison signals.

In accordance with one embodiment of the present invention, the signal comparison means comprises: first differential amplifier means for comparing the first and second distance signals to one another to generate the first comparison signal; second differential amplifier means for comparing the third and fourth distance signals to one another to generate the second comparison signal; and, circuit means for generating the resultant wear signal by taking the square root of the sum of the squares of the first and second comparison signals.

In accordance with a further embodiment of the present invention, the signal comparison means comprises a programmable processor.

The stationary housing may comprise the housing of a sealless pump. Provided within the pump is a containment shell for enclosing the rotor. The containment shell is interposed between the at least one magnet and the first, second, third and fourth radial hall effect means.

Preferably, the monitoring apparatus includes temperature sensing means for sensing the temperature of the containment shell. The programmable processor may be coupled to the temperature sensing means for monitoring the temperature of the containment shell. The apparatus may additionally include power level sensing means for sensing the electrical power driving the pump. The programmable processor may also be coupled to the power level sensing means for monitoring the electric power.

The monitoring apparatus further comprises first axial hall effect means mounted in the housing and spaced a defined distance on one side of the plane defined by the first and second axes for generating a first axial signal as the at least one magnet passes thereby. Second axial hall effect means is mounted in the housing and spaced a defined distance on a side opposite to the one side of the plane for generating a second axial signal as the at least one magnet passes thereby. The signal comparison means compares the first and second axial signals to one another to generate an axial wear signal which is indicative of axial wear of the bearing means.

The first and second axial hall effect means are preferably located on the circumferential portion of the housing. The first axial hall effect means is spaced a predetermined distance along the circumference of the circumferential portion from the first radial hall effect means such that the first axial signal leads the first distance signal when the rotor rotates in a first rotation direction, and the first axial signal lags the first distance signal when the rotor rotates in a second, opposite rotation direction. The signal comparison means further serves to generate a rotation direction signal based upon the sequence in which the first axial signal and the first distance signal are generated.

In accordance with a second aspect of the present invention, an apparatus is provided for monitoring a rotating member within a stationary housing. The stationary housing includes bearing means for mounting the rotating member for rotation about a member axis. The apparatus comprises magnet means mounted about the circumference of the rotating member for generating magnetic flux. Radial hall effect means is fixedly mounted in the housing adjacent to the rotating member for sensing magnetic flux density as the magnet means passes thereby and for generating at least two distance signals representative of the distance separating the radial hall effect means and the rotating member in response to the magnetic flux. Signal comparison means is provided for comparing the at least two distance signals to generate a comparison signal which is representative of radial wear of the bearing means.

In accordance with a third aspect of the present invention, an apparatus is provided for monitoring a rotor within a stationary housing. The stationary housing includes bearing means for mounting the rotor for rotation about a rotor axis. The monitoring apparatus includes first and second magnets fixedly mounted within the housing. Magnetic material means is mounted on the circumference of the rotor for acting with the first and second magnets to conduct magnetic flux which passes between the rotor and the housing. First radial hall effect means is fixedly mounted in the housing adjacent to the first magnet and the rotor for sensing magnetic flux density when the magnetic material means is positioned adjacent thereto and for generating a first distance signal representative of the distance separating the first radial hall effect means and the rotor in response to the magnetic flux density. Second radial hall effect means is fixedly mounted in the housing adjacent to the second magnet and the rotor for sensing magnetic flux density when the magnetic material means is positioned adjacent thereto and for generating a second distance signal representative of the distance separating the second radial hall effect means and the rotor in response to the magnetic flux density. Signal comparison means is provided for comparing the first and second distance signals to one another to generate a first comparison signal which is representative of the difference between the distance separating the first radial hall effect means and the rotor and the distance separating the second radial hall effect means and the rotor. The first comparison signal is representative of radial wear of the bearing means along a first axis which passes through the first and second radial hall effect means.

The monitoring apparatus further includes third and fourth magnets fixedly mounted within the housing. Third radial hall effect means is fixedly mounted in the housing adjacent to the third magnet and the rotor for sensing magnetic flux density when the magnetic material means is positioned adjacent thereto and for generating a third distance signal representative of the distance separating the third radial hall effect means and the rotor in response to the magnetic flux density. Fourth radial hall effect means is fixedly mounted in the housing adjacent to the fourth magnet and the rotor for sensing magnetic flux density when the magnetic material means is positioned adjacent thereto and for generating a fourth distance signal representative of the distance separating the fourth radial hall effect means and the rotor in response to the magnetic flux density. The signal comparison means further compares the third and fourth distance signals to one another to generate a second comparison signal which is representative of the difference between the distance separating the third radial hall effect means and the rotor and the distance separating the fourth radial hall effect means and the rotor. The second comparison signal is representative of radial wear of the bearing means along a second axis which passes through the third and fourth radial hall effect means.

In an illustrative embodiment, the first axis which passes through the first and second radial hall effect means and the second axis which passes through the third and fourth radial hall effect means are substantially perpendicular to one another and define a plane which is substantially perpendicular to the rotor axis. The first, second, third and fourth radial hall effect means are spaced substantially equidistantly about a circumferential portion of the housing. Preferably, the circumferential portion of the housing comprises a sensor ring which is coaxial with the rotor.

The apparatus further comprises first axial hall effect means fixedly mounted on the circumferential portion of the housing adjacent to the first magnet and spaced a defined distance on one side of the plane defined by the first and second axes for sensing magnetic flux density when the magnetic material means is positioned adjacent thereto and for generating a first axial signal in response to sensing the magnetic flux density. Second axial hall effect means is fixedly mounted on the circumferential portion of the housing adjacent to the second magnet and spaced a defined distance on a side opposite to the one side of the plane for sensing magnetic flux density when the magnetic material means is positioned adjacent thereto and for generating a second axial signal in response to sensing the magnetic flux density. The signal comparison means compares the first and second axial signals to one another to generate an axial wear signal which is indicative of axial wear for the bearing means.

The magnetic material means may comprise magnetic material mounted about the circumference of the rotor and having a notch therein. The first axial hall effect means generates the first axial signal after the notch passes thereby and the first radial hall effect means generates the first distance signal after the notch passes thereby. The first axial hall effect means is spaced a predetermined distance along the circumference of the circumferential portion from the first radial hall effect means such that the first axial signal leads the first distance signal when the rotor rotates in a first rotation direction, and the first axial signal lags the first distance signal when the rotor rotates in a second, opposite rotation direction. The signal comparison means generates a rotation direction signal based upon the sequence in which the first axial signal and first distance signal are generated.

The magnetic material means may alternatively comprise magnetic material mounted about substantially the entire circumference of the rotor. The magnetic material means may also comprise a plurality of sections of magnetic material mounted about the circumference of the rotor.

In accordance with a fourth aspect of the present invention, an apparatus is provided for monitoring a rotating member within a stationary housing. The stationary housing includes bearing means for mounting the rotating member for rotation about a member axis. The apparatus comprises magnet means fixedly mounted within the housing for generating magnetic flux. Magnetic material means is mounted on the circumference of the rotating member for acting with the magnet means to conduct magnetic flux which passes between the rotating member and the housing. Radial hall effect means is fixedly mounted in the housing adjacent to the magnet means and the rotating member for sensing magnetic flux density when the magnetic material means is positioned adjacent thereto and for generating at least two distance signals representative of the distance separating the radial hall effect means and the rotating member in response to the magnetic flux density. Signal comparison means is further provided for comparing the at least two distance signals to generate comparison signals which are representative of radial wear for the bearing means.

Accordingly, it is an object of the present invention to provide an apparatus for monitoring a rotor mounted for rotation by bearings within a stationary housing to generate signals representative of radial and axial bearing wear. It is a further object of the present invention to provide an apparatus for monitoring a rotor mounted for rotation by bearings within a stationary housing to generate signals representative of whether the rotor is rotating and, if so, the direction and speed of its rotation. It is another object of the present invention to provide an apparatus for monitoring a rotor mounted for rotation by bearings within a stationary housing of a sealless pump to generate signals representative of radial and axial bearing wear as well as signals representative of the direction of rotation of the rotor. It is yet another object of the present invention to provide an apparatus for monitoring a rotor mounted for rotation by bearings within a stationary housing of a sealless pump and for monitoring at least one temperature within the pump as well as the electrical power driving the pump.

These and other objects and advantages of the present invention will be apparent from the following description, the accompanying drawings, and the appended claims.

DETAILED DESCRIPTION OF THE INVENTION

The present invention is directed to an apparatus for monitoring a rotor mounted by bearings within a stationary housing of a rotary machine. Because the present invention is particularly applicable for monitoring a rotor within a sealless pump, it will be described with reference to this application.

Figure 1:
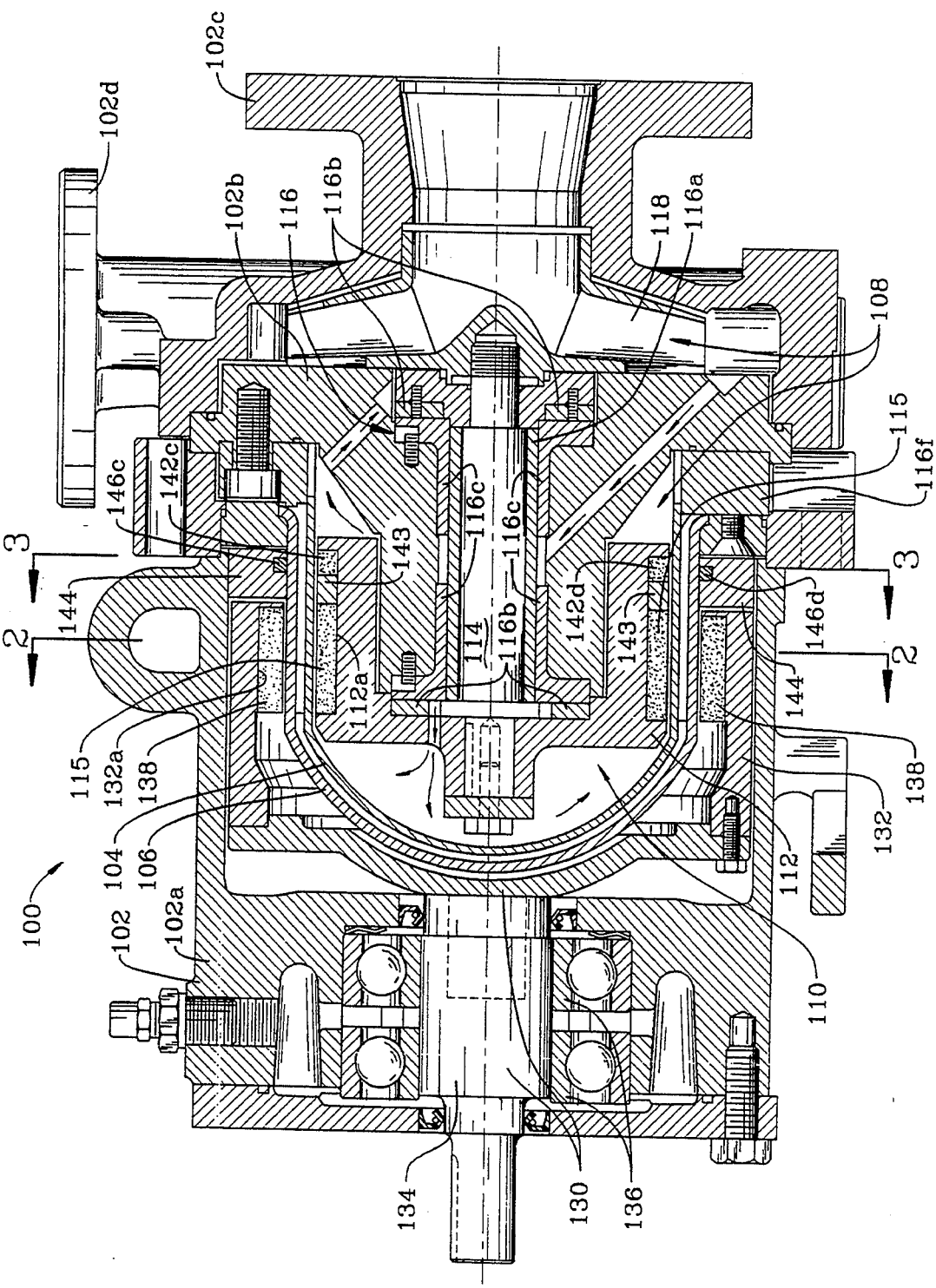
FIG. 1 is a side elevational view partially in cross-section of a sealless pump having a first embodiment of the monitoring apparatus of the present invention associated therewith.

A sealless pump 100 is shown in cross-section in FIG. 1 and comprises a stationary housing 102 having an outer casing portion 102a, a bearing holder portion 102b, an inlet portion 102c and an outlet portion 102d. Provided within the housing 102 is a primary containment shell 104 and an outer, secondary containment shell 106. The primary containment shell 104 defines a portion of a sealed chamber 108 through which fluid passes as it is circulated from the inlet portion 102c to the outlet portion 102d. While primary and secondary containment shells 104 and 106 are shown, it should be apparent that the housing 102 may alternatively contain only a single containment shell.

A driven magnet assembly 110 (also referred to herein as a rotor) is located within the primary containment shell 104 and includes an inner support 112 fixedly connected to a drive shaft 114 for rotation therewith. A plurality of inner magnets 115 are mounted substantially equidistantly about an outer surface 112a of the support 112. The driven magnet assembly 110 is rotatably mounted in the bearing holder portion 102b of the housing 102 by bearing means 116 comprising a journal-sleeve 116a, thrust-journals 116b and bushings 116c. A pump impeller 118 is threadedly connected to the drive shaft 114 for rotation therewith. Upon rotation of the drive shaft 114, the impeller 118 forces fluid from the inlet portion 102c of the housing 102 through the sealed chamber 108 and out from the pump 100 via the outlet portion 102d.

Figure 2:
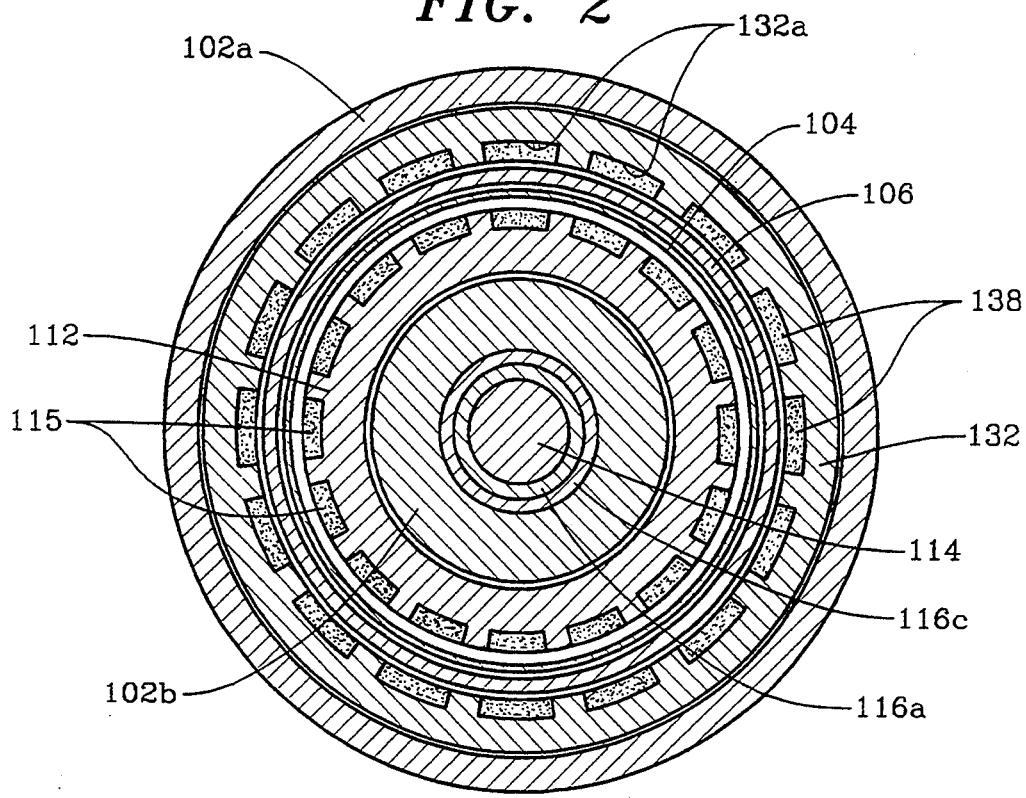
FIG. 2 is a cross-sectional view taken generally along section line 2—2 in FIG. 1 and including in cross-section the portion of the sealless pump not shown in FIG. 1.

A drive magnet assembly 130 is positioned outside the containment shell 106 and comprises an outer support 132 fixedly connected to a drive shaft 134 for rotation therewith. The drive shaft 134 is rotatably mounted in the outer casing portion 102a of the housing 102 by rolling-element bearings 136. A plurality of outer magnets 138 are mounted about an inner surface 132a of the support 132 and are spaced substantially equidistantly about the circumference of the inner surface 132a, see FIG. 2.

The outer magnets 138 have alternating magnetic polarities. The inner magnets 115 likewise have alternating magnetic polarities and are attracted to corresponding opposing outer magnets 138. Consequently, a "magnetic coupling" is formed between the inner and outer magnets 115 and 138 due to the attraction between the same. Pump motor 165 (see FIG. 5) is provided for rotating the drive shaft 134 and, hence, the outer support 132. As the drive shaft 134 rotates, the attraction between the inner and outer magnets 115 and 138 causes the inner support 112 and the impeller 118 to rotate with the outer support 132.

A monitoring apparatus 140 in accordance with a first embodiment of the present invention will now be described with reference to FIG. 5. The monitoring apparatus 140 monitors the driven magnet assembly 110, provides an indication of radial and axial wear of the bearing means 116 and provides an indication of whether the driven magnet assembly 110 is rotating and, if so, its speed and direction of rotation. A portion of the description of the monitoring apparatus 140 herein will be discussed with regard to radial and axial bearing wear. Reference to radial and axial bearing wear is intended to include not only radial and axial wear of the bearing means 116, but any wear which may also occur to the shaft 114 as well.

Figure 3:
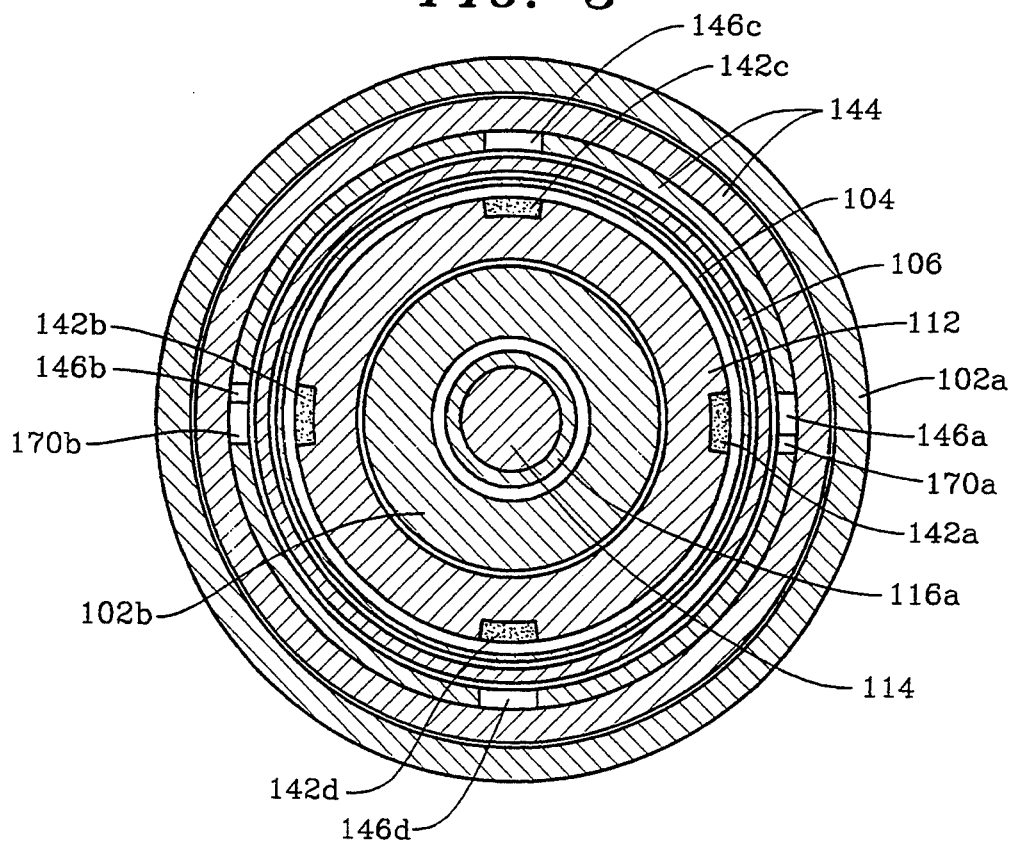
FIG. 3 is a cross-sectional view taken generally along section line 3—3 in FIG. 1 and including in cross-section the portion of the sealless pump not shown in FIG. 1.
Figure 4:
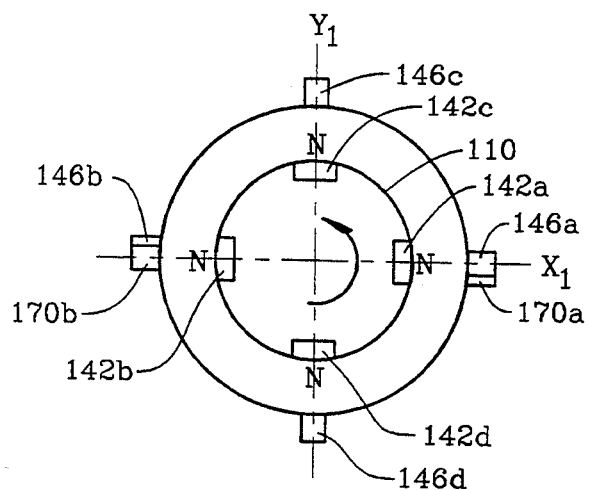
FIG. 4 is a schematic cross-sectional end view of a sealless pump illustrating radial and axial hall effect devices of first and second embodiments of the monitoring apparatus of the present invention.

In order to monitor radial wear of the bearing means 116, first, second, third and fourth magnets 142a–142d, spaced substantially 90° apart from one another, are mounted about the outer surface 112a of the inner support 112, see FIGS. 3 and 4. Nonmagnetic material 143, as shown in FIG. 1, is interposed between the magnets 142a–142d and the inner magnets 115 to separate the same from one another. Positioned about the secondary containment shell 106 and fixedly connected to the outer casing portion 102a of the housing 102 is a sensor ring 144. Housed within the sensor ring 144 are first, second, third and fourth radial hall effect devices 146a–146d which serve to sense magnetic flux density as the magnets 142a–142d rotate thereby.

Figure 5:
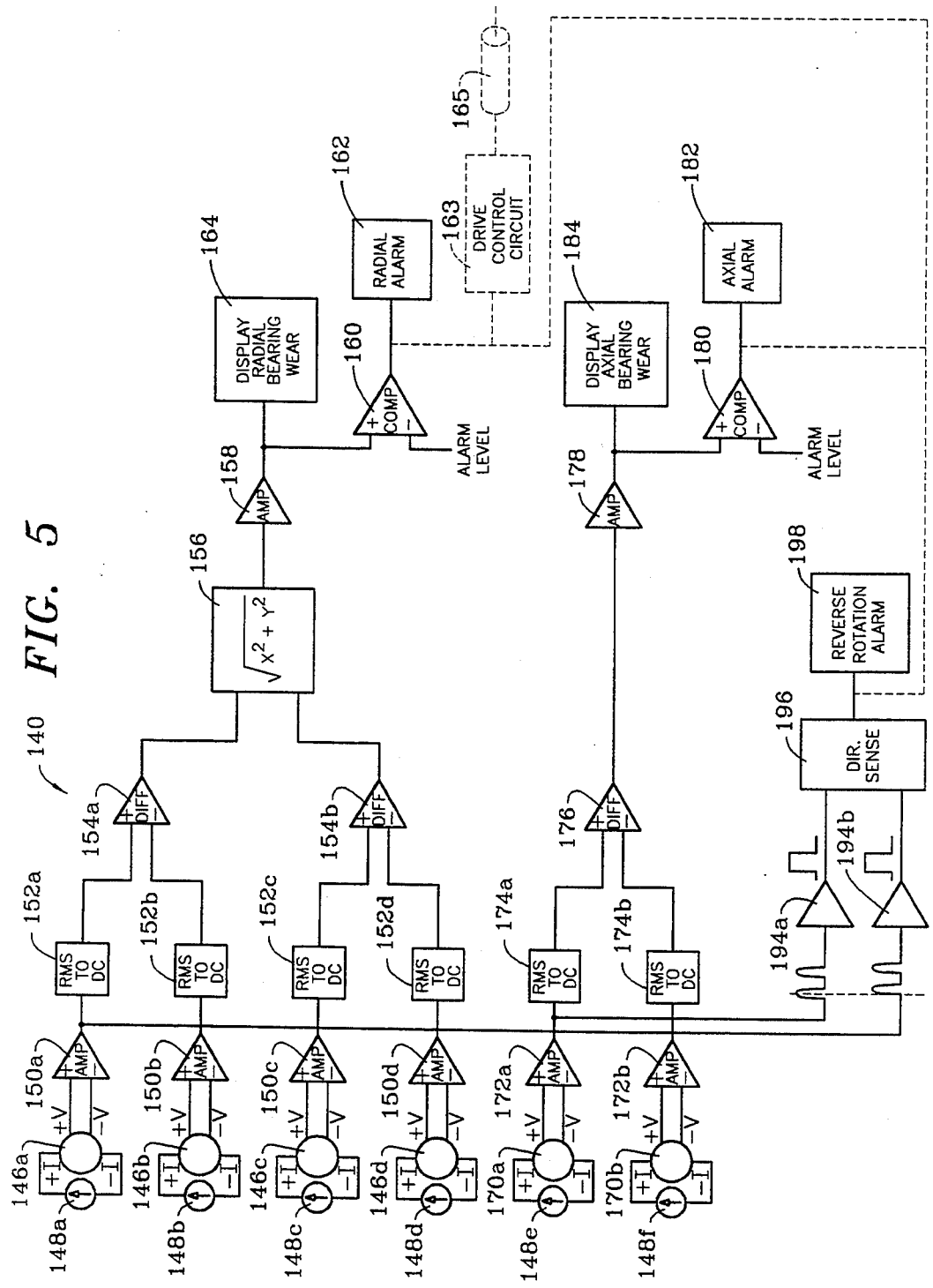
FIG. 5 is a schematic block diagram of the first embodiment of the monitoring apparatus of the present invention.

Each of the radial hall effect devices 146a–146d is connected to a respective constant current source 148a–148d, as shown in FIG. 5, and generates an output voltage in proportion to the amount of magnetic flux density that impinges at a perpendicular angle to the surface of the device. Because the magnetic flux density generated by the magnets 142a–142d varies with distance, the output voltage generated by each radial hall effect device 146a–146d is related to the distance separating the radial hall effect device and the driven magnet assembly 110.

As shown in FIG. 4, the first and second radial hall effect devices 146a and 146b are positioned substantially diametrically opposed to one another such that a first axis $X_1$ passes through the first and second devices 146a and 146b. Likewise, the third and fourth radial hall effect devices 146c and 146d are positioned substantially diametrically opposed to one another such that a second axis $Y_1$ passes through the third and fourth devices 146c and 146d.

Each of the radial hall effect devices 146a–146d is additionally connected to a respective amplifier 150a–150d, as shown in FIG. 5. Each amplifier 150a–150d is, in turn, connected to a respective RMS-to-DC (root mean square-to-direct current) converter 152a–152d. Each of the RMS-to-DC converters 152a–152d generates DC distance signals related to the distance separating its corresponding radial hall effect device 146a–146d and the driven magnet assembly 110.

The DC distance signals generated by the RMS-to-DC converters 152a and 152b are supplied to a first differential amplifier 154a, while the distance signals generated by the RMS-to-DC converters 152c and 152d are supplied to a second differential amplifier 154b. The first differential amplifier 154a generates a first differential signal X (also referred to herein as a first comparison signal) which is representative of the difference $\Delta X$ between the distance $X_A$ separating the first radial hall effect device 146a and the driven magnet assembly 110 and the distance $X_B$ separating the second radial hall effect device 146b and the driven magnet assembly 110, see FIG. 6. Accordingly, the first differential signal X is representative of radial wear of the bearing means 116 along the first axis $X_1$. Similarly, the second differential amplifier 154b generates a second differential signal Y (also referred to herein as a second comparison signal) which is representative of the difference $\Delta Y$ between the distance $Y_A$ separating the third radial hall effect 146c and the driven magnet assembly 110 and the distance $Y_B$ separating the fourth radial hall effect device 146d and the driven magnet assembly 110. The second differential signal Y is representative of radial wear of the bearing means 116 along the second axis $Y_1$.

Figure 6:
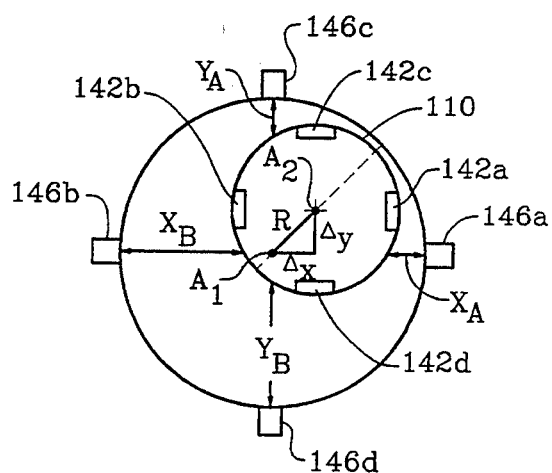
FIG. 6 is a schematic cross-sectional end view of a sealless pump illustrating movement of a driven magnet assembly due to radial bearing wear.

Circuit means 156 receives the first and second differential signals X and Y and generates a resultant wear signal by taking the square root of the sum of the squares of the first and second differential signals X and Y. As shown in FIG. 6, the resultant wear signal is representative of the distance R separating a first centerline axis $A_1$ of the shaft 114 and a second centerline axis $A_2$ of the shaft 114 and is indicative of the total resultant radial wear of the bearing means 116. The circuit means 156 may be constructed in a well known manner from two AD637 RMS-to-DC converters, which are commercially available from Analog Devices, Inc., Norwood, Mass.

The resultant wear signal generated by the circuit means 156 is received by an amplifier 158 which scales that signal to an appropriate level to allow for comparison to an alarm level by a differential amplifier 160. If the scaled resultant wear signal exceeds the alarm level, the amplifier 160 generates an alarm signal which is received by a conventional alarm means 162, which may be a visual and/or an audible alarm. The scaled resultant wear signal is additionally connected to a conventional visual display means 164 for displaying the resultant radial bearing wear amount. The alarm signal may also be connected to a drive control circuit 163 which would stop operation of the pump motor 165.

Figure 7A:
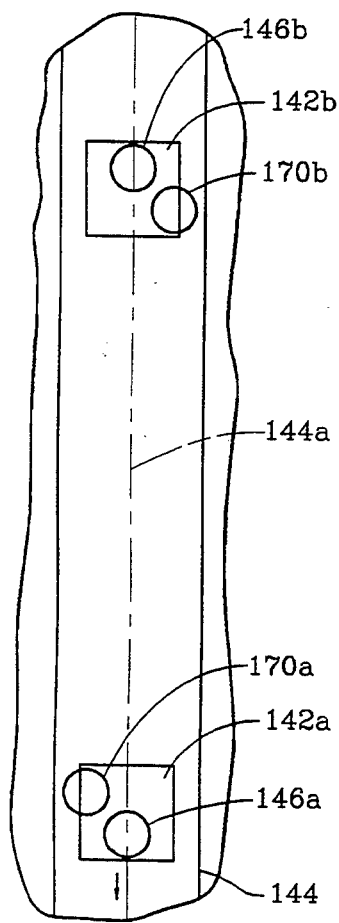
FIG. 7a is a schematic illustration of a portion of a sensor ring shown in FIG. 1 projected in a planar manner with axial and radial hall effect devices superimposed over the sensor ring and illustrating substantially zero bearing wear.

For monitoring axial wear of the bearing means 116, first and second axial hall effect devices 170a and 170b, respectively, are mounted in the sensor ring 144, see FIGS. 4 and 7a. The first axial hall effect device 170a, as best shown in FIG. 7a, is mounted on one side of a plane 144a which passes through the center of the sensor ring 144, while the second axial hall effect device 170b is mounted on a second, opposite side of the plane 144a.

Each of the first and second axial hall effect devices 170a and 170b, as shown in FIG. 5, is connected to a respective constant current source 148e and 148f and generates an output voltage in proportion to the amount of magnetic flux density that impinges at a perpendicular angle to the surface of the device. The axial hall effect devices 170a and 170b are further connected to amplifiers 172a and 172b which, in turn, are connected to RMS-to-DC converters 174a and 174b.

As one of the rotating magnets 142a–142d passes beneath the axial hall effect device 170a, the RMS-to-DC converter 174a generates a first signal representative of the amount of surface area of the magnet passing directly beneath the axial hall effect device 170a. Likewise, as one of the rotating magnets 142a–142d passes beneath the axial hall effect device 170b, the RMS-to-DC converter 174b generates a second signal which is representative of the surface area of the magnet passing directly beneath the axial hall effect device 170b. The first and second signals generated by the RMS-to-DC converters 174a and 174b are supplied to a third differential amplifier 176 which compares the first and second signals to one another and generates a differential signal which is indicative of axial wear of the bearing means 116.

In FIG. 7a, which is a schematic illustration showing magnets 142a and 142b passing beneath axial hall effect devices 170a and 170b, the surface area of magnet 142a passing beneath axial hall effect device 170a is substantially equal to the surface area of magnet 142b passing beneath axial hall effect device 170b. Consequently, for the example illustrated in FIG. 7a, the resultant axial wear signal generated by the third differential amplifier 176 would be substantially zero.

Figure 7B:
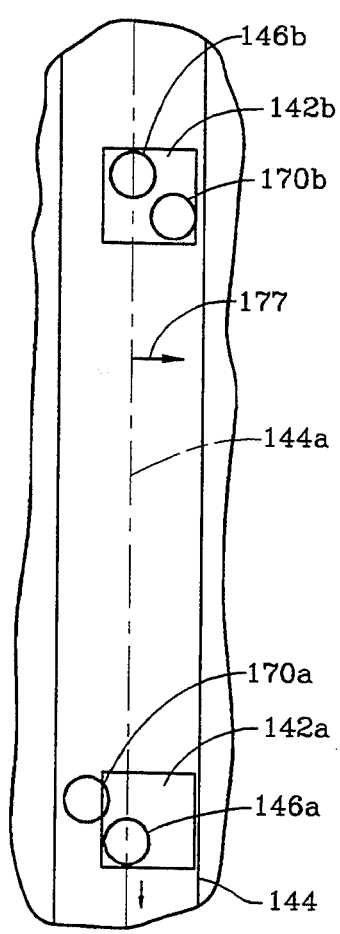
FIG. 7b is a schematic illustration of a portion of the sensor ring shown in FIG. 1 projected in a planar manner with axial and radial hall effect devices superimposed over the sensor ring and illustrating bearing wear causing magnets 142a and 142b to shift in the direction designated by an arrow 177.

In FIG. 7b, the surface area of magnet 142a passing beneath axial hall effect device 170a is substantially less than the surface area of magnet 142b passing beneath axial hall effect device 170b. Consequently, for the example illustrated in FIG. 7b, the resultant axial wear signal generated by the third differential amplifier 176 will have a nonzero value indicative of the amount of axial wear of the bearing means 116 and the negative value of the signal will indicate the direction, designated by arrow 177, in which the magnets 142a–142d have moved away from the centerplane 144a.

Figure 7C:
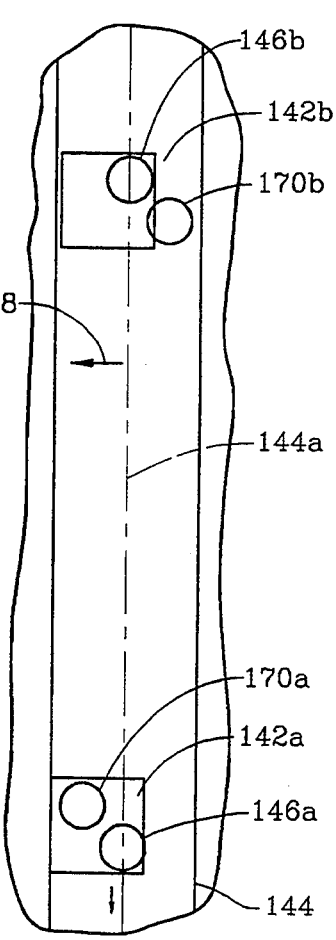
FIG. 7c is a schematic illustration of a portion of the sensor ring shown in FIG. 1 projected in a planar manner with axial and radial hall effect devices superimposed over the sensor ring and illustrating bearing wear causing the magnets 142a and 142b to shift in the direction designated by an arrow 178.

In FIG. 7c, the surface area of magnet 142a passing beneath axial hall effect device 170a is substantially more than the surface area of magnet 142b passing beneath axial hall effect device 170b. Consequently, for the example illustrated in FIG. 7c, the axial wear signal generated by the third differential amplifier 176 will have a nonzero value which is indicative of the amount of axial wear of the bearing means 116 and the positive value of the signal will indicate the direction, designated by arrow 178, in which the magnets 142a–142d have moved away from the centerplane 144a.

The axial wear signal generated by differential amplifier 176 is received by an amplifier 178 which scales that signal to an appropriate level to allow for comparison to an alarm level by a differential amplifier 180, see FIG. 5. If the axial bearing wear signal exceeds the alarm level, the amplifier 180 generates an alarm signal which is received by a conventional alarm means 182, which may be a visual and/or an audible alarm. The scaled signal generated by the amplifier 178 is additionally input into a conventional visual display means 184 for displaying the amount of axial bearing wear. The alarm signal may also be input into the drive control circuit 163 which would stop operation of the pump motor 165.

Calibration of the monitoring apparatus is manually performed in a conventional manner by potentiometers (not shown) which are connected to the amplifiers 150a–150d, 172a and 172b.

Figure 8A:
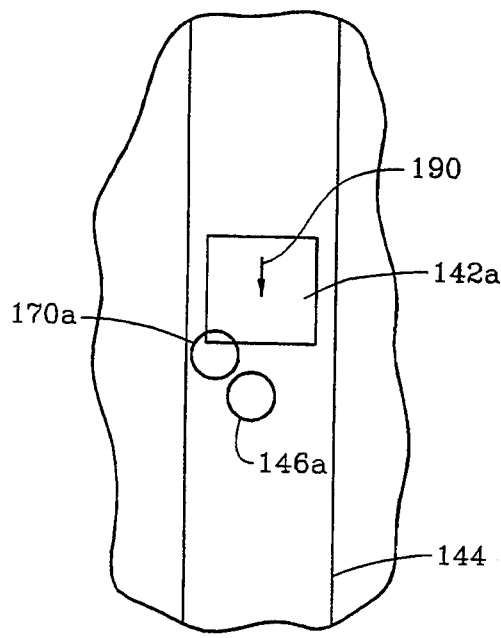
FIG. 8a is a schematic illustration of a portion of the sensor ring shown in FIG. 1 projected in a planar manner with the first axial hall effect device and the first radial hall effect device superimposed over the sensor ring and illustrating rotation of a driven magnet assembly in a first rotation direction.
Figure 8B:
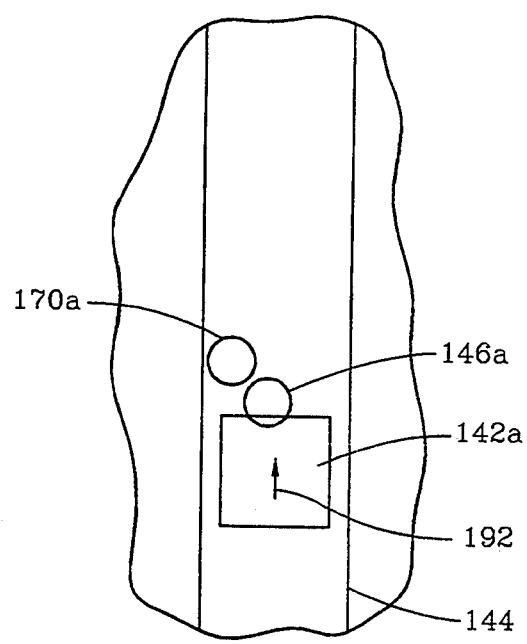
FIG. 8b is a schematic illustration of a portion of the sensor ring shown in FIG. 1 projected in a planar manner with the first axial hall effect device and the first radial hall effect device superimposed over the sensor ring and illustrating rotation of the driven magnet assembly in a second rotation direction.

To permit the direction of rotation of the driven magnet assembly 110 to be determined, the first axial hall effect device 170a is spaced a predetermined distance along the circumference of the sensor ring 144 from the first radial hall effect device 146a, as shown in FIG. 8a. Consequently, as one of the magnets 142a–142d passes the two hall effect devices 170a and 146a when the driven magnet assembly 110 rotates in a first rotation direction, designated by arrow 190 in FIG. 8a, the signal generated by the axial hall effect device 170a leads the signal generated by the radial hall effect device 146a. When, on the other hand, the driven magnet assembly 110 rotates in a second, opposite rotation direction, designated by arrow 192 in FIG. 8b, the signal generated by the axial hall effect device 170a lags the signal generated by the radial hall effect device 146a.

As shown in FIG. 5, the signals generated by the amplifiers 150a and 172a are further connected to waveshaping amplifiers 194a and 194b which, in turn, generate signals which are connected to direction sensing means 196. The direction sensing means 196 comprises a logic circuit for determining whether the signal generated by the amplifier 194a leads or lags the signal generated by the amplifier 194b and generates a rotation direction signal based upon the sequence in which the signals from the amplifiers 194a and 194b are received. A conventional alarm means 198, which may be a visual and/or an audible alarm, receives the rotation direction signal and is activated if the signal generated by the amplifier 194b leads the signal generated by the amplifier 194a. The rotation direction signal may also be connected to the drive control circuit 163 which would stop operation of the pump motor 165 if the signal generated by the amplifier 194b leads the signal generated by the amplifier 194a.

Figure 9:
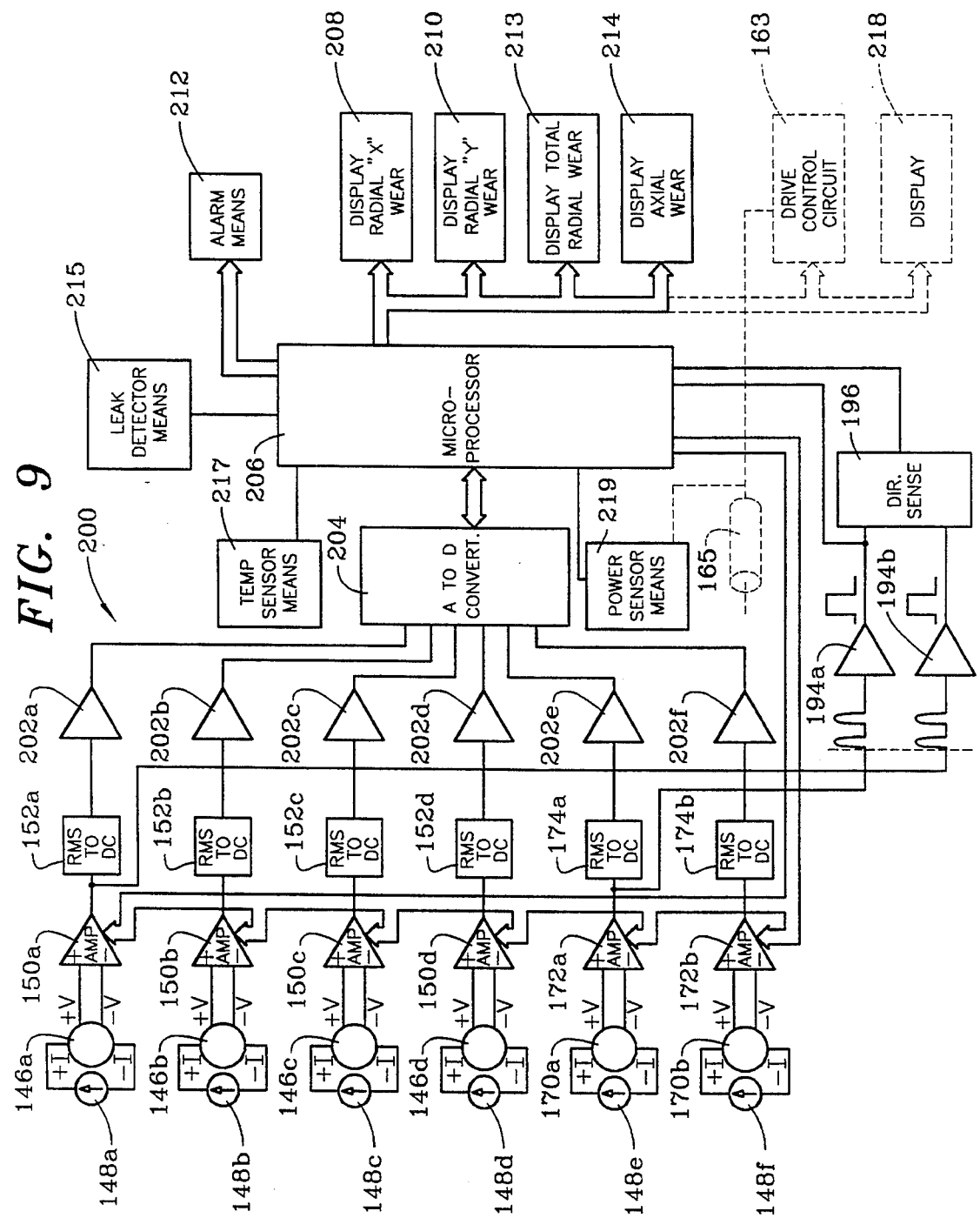
FIG. 9 is a schematic representation of the second embodiment of the monitoring apparatus of the present invention.

A first alternative embodiment of monitoring apparatus 200 of the present invention is shown in FIG. 9, where like reference numerals indicate like elements. The monitoring apparatus 200 includes magnets 142a–142d, radial hall effect devices 146a–146d, constant current sources 148a–148d, amplifiers 150a–150d, and RMS-to-DC converters 152a–152d which are arranged in the same manner as described above with regard to the monitoring apparatus 140.

The signals generated by the RMS-to-DC converters 152a–152d are supplied to amplifiers 202a–202d which scale those signals to an appropriate level for connection to an analog-to-digital (A/D) converter 204. The A/D converter 204 digitizes the signals received from amplifiers 202a–202d and connects those digital signals to a programmable microprocessor 206.

The microprocessor 206 processes the signals received from the A/D converter 204 to digitally perform the comparisons and calculations which are performed by the analog circuitry of FIG. 5. Thus, the signals are subtracted from one another and further mathematically processed to generate the square root of the sum of the squares of the resulting differential signals. In this way, the microprocessor 206 generates a first differential signal X which is representative of the difference $\Delta X$ between the distance $X_A$ separating the first radial hall effect 146a and the driven magnet assembly 110 and the distance $X_B$ separating the second radial hall effect device 146b and the driven magnet assembly 110, see FIG. 6.

Similarly, the microprocessor 206 generates a second differential signal Y which is representative of the difference $\Delta Y$ between the distance $Y_A$ separating the third radial hall effect 146c and the driven magnet assembly 110 and the distance $Y_B$ separating the fourth radial hall effect device 146d and the driven magnet assembly 110. The first differential signal X is passed to a first conventional visual display means 208 for displaying the amount of radial wear along the $X_1$ axis, while the second differential signal Y is passed to a second conventional visual display means 210 for displaying the amount of radial wear along the $Y_1$ axis.

The microprocessor 206 further generates a resultant wear signal by taking the square root of the sum of the squares of the first and second differential signals X and Y. The resultant wear signal is then compared to a predetermined resultant radial alarm limit and, if the resultant wear signal exceeds the alarm limit, the microprocessor 206 generates an alarm signal which activates a radial alarm forming part of alarm means 212. The radial alarm may comprise a convention visual and/or audible alarm. Further, the resultant wear signal is passed to a third conventional visual display means 213 for displaying the resultant radial bearing wear amount.

For monitoring axial bearing wear, the monitoring apparatus 200 further includes first and second axial hall effect devices 170a and 170b, constant current sources 148e and 148f, amplifiers 172a and 172b, and RMS-to-DC converters 174a and 174b which are arranged in the same manner as discussed above with regard to the monitoring apparatus 140 of FIG. 5.

As one of the magnets 142a–142d passes beneath the axial hall effect device 170a, the RMS-to-DC converter 174a generates a first signal which is representative of the surface area of the magnet that passes directly beneath the axial hall effect device 170a. Likewise, as one of the magnets 142a–142d passes beneath the axial hall effect device 170b, the RMS-to-DC converter 174b generates a second signal which is representative of the surface area of the magnet passing directly beneath the axial hall effect device 170b. The first and second signals generated by the RMS-to-DC converters 174a and 174b are supplied to amplifiers 202e and 202f which scale those signals for the A/D converter 204. The A/D converter 204 digitizes the first and second signals and passes those digital signals to the programmable microprocessor 206. The microprocessor 206 digitally processes the first and second signals to generate a differential signal which is indicative of axial wear of the bearing means 116.

The differential signal is compared to a predetermined axial alarm limit by the microprocessor 206. If the differential signal exceeds the axial alarm limit, the microprocessor 206 generates an alarm signal which activates an axial alarm forming part of the alarm means 212. The axial alarm may comprise a convention visual and/or audible alarm. Further, the differential signal is passed to a fourth conventional visual display means 214 for displaying the axial bearing wear amount.

To facilitate calibration of the monitoring apparatus 140 to account for, inter alia, sensitivity differences between the hall effect devices 146a–146d and 170a, 170b due to manufacturing variations, magnetic flux differences between the magnets 142a–142d, and imprecise mounting of the sensors 146a–146d and 170a, 170b and the magnets 142a–142d, the amplifiers 150a–150d and 172, 172b comprise programmable gain amplifiers. The programmable gain amplifiers 150a–150d and 172a, 172b allow for calibration to ensure that signals, indicating zero radial and axial bearing wear, are generated by the circuit means 156 and the differential amplifier 176 during initial set-up. Programmable gain amplifiers are commercially available from Analog Devices, Inc., as Model AD625 Programmable Gain Instrumentation Amplifier or Model AD524 Precision Instrumentation Amplifier.

As shown schematically in FIG. 9, the programmable gain amplifiers 150a–150d and 172a, 172b are connected to the microprocessor 206 which acts to calibrate each of the amplifiers 150a–150d and 172a, 172b to appropriate levels to ensure that radial and axial bearing wear amounts, which are displayed by the visual display means 208, 210, 212 and 214, are substantially zero during initial set-up. Alternately, the programmable gain amplifiers 150a–150d and 172a, 172b can be set to ensure that the voltage signals from the sensors 146a–146d and 170a, 170b are within the useable range of the A/D converter 204. Calibration is then performed by determining and storing offset parameters within the microprocessor 206.

In order to provide an indication of the direction of rotation of the driven magnet assembly 110, the monitoring apparatus includes wave-shaping amplifiers 194a and 194b and direction sensing means 196 which are arranged in the same manner as discussed above with regard to monitoring apparatus 140. As noted previously, the direction sensing means 196 generates a rotation direction signal based upon the sequence in which the signals output by the amplifiers 194a and 194b are generated.

The rotation direction signal is connected to the microprocessor 206 which activates a rotation direction alarm, which forms part of the alarm means 212, if the signal generated by the amplifier 194b leads the signal generated by the amplifier 194a. The microprocessor 206 may additionally generate a signal input to the pump drive means 163 to stop operation of the pump 100 if the signal generated by the amplifier 194b leads the signal generated by the amplifier 194a.

The frequency of the signals from the wave-shaping amplifiers 194a and 194b are proportional to the speed of rotation of the driven magnet assembly 110. Accordingly, these signals can be monitored to determine whether the driven magnet assembly 110 is rotating and, if so, the speed at which it is rotating. To this end, the signals or pulses from the wave-shaping amplifier 194a are passed to the microprocessor 206 which monitors and/or counts the pulses. Thus, the microprocessor 206 can display operating speed and/or generate an alarm for underspeed or zero speed conditions via the alarm means 212.

Zero speed detection when the driven magnet assembly 110 should be rotating indicates a jammed condition and/or a decoupling between the driven magnet assembly 110 and the drive magnet assembly 130. Such decoupling could result in overheating of the containment shell due to eddy currents caused by rotating the drive magnet assembly 130 without the cooling performed by fluid flow within the containment shell. Overheating can result in serious damage to the driving and driven magnets, the bearings and the containment shell with possible fluid leakage to the atmosphere.

Temperature sensor means 217 is associated with fluid flowing through the pump and the containment shell 104 for sensing the temperature of the fluid and the containment shell and for generating corresponding temperature signals. The temperature sensor means 217 may comprise a conventional containment shell temperature probe (not shown) which is spring biased into contact with the primary shell 104 for monitoring the temperature of the primary shell 104 and a conventional fluid temperature probe (not shown) which extends through containment shell flange 116f to sense the temperature of the fluid passing through the pump 100. The temperature signals are connected to the microprocessor 206 which compares the temperature signals to predetermined ceiling temperature levels. If the temperature signals exceed the ceiling temperature levels, the microprocessor 206 generates an alarm signal activating a temperature alarm, which forms part of the alarm means 212. The microprocessor 206 may further generate a signal which is input to the pump drive control circuit 163 to stop operation of the pump 100. Additionally, a visual display 218 may be provided to display the sensed temperature of the containment shell 104, rotation speed of the driven magnet assembly 110 and the like.

Associated with the pump drive control circuit 163 is power level sensing means 219 for sensing the amount of electrical power driving the pump drive motor 165 and for generating a power signal representative thereof. The power signal is passed to the microprocessor 206 which compares the power signal to predetermined upper and lower alarm limits. If the power signal falls below the lower limit or exceeds the upper limit, the microprocessor 206 generates an alarm signal activating a power alarm, which forms part of the alarm means 212. The microprocessor 206 may additionally generate a signal which is passed to the pump drive control circuit 163 to stop operation of the pump 100. Additionally, the visual display 218 may be switched to display the amount of electrical power driving the pump motor 165.

Leak detector means 215 is associated with the primary and secondary containment shells 104 and 106 for sensing fluid leaking from the primary shell 104 into the secondary shell 106 and for generating a leak detection signal upon detecting fluid in the secondary shell 106. The leak detection signal is connected to the microprocessor 206. Upon receiving the leak detection signal, the microprocessor 206 generates a signal which is passed to the pump drive control circuit 163 to stop operation of the pump 100.

As should be apparent, because the microprocessor 206 is capable of monitoring such things as the temperature of the primary containment shell 104 and the fluid flowing through the pump 100 as well as the amount of electrical power driving the pump drive motor 165, a separate microprocessor which normally would be required to monitor such parameters is eliminated. Further, the microprocessor 206 eliminates analog circuitry which would otherwise be required with an entirely analog monitoring apparatus for example as shown in FIG. 5.

Figure 10:
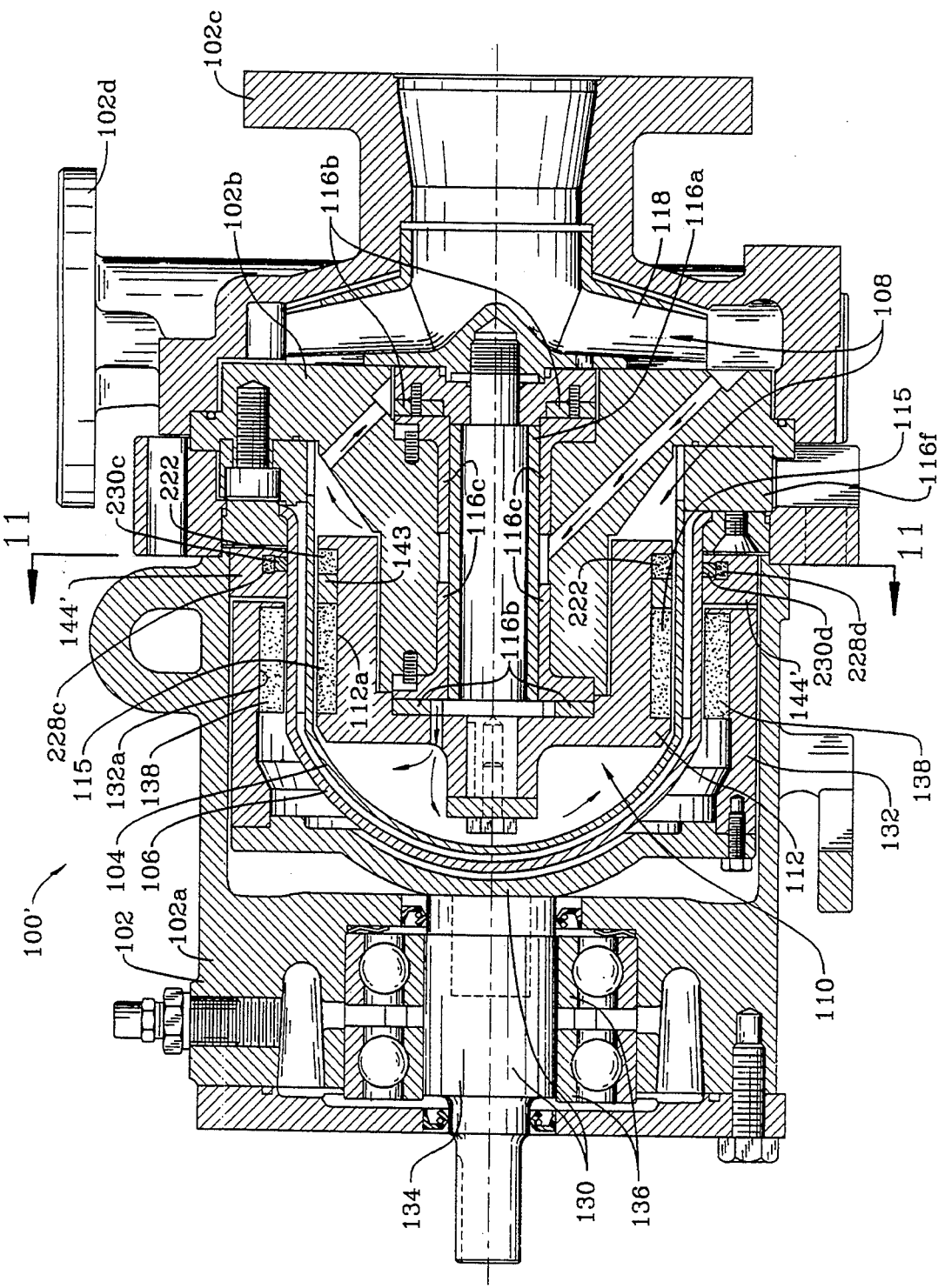
FIG. 10 is a side elevational view partially in cross-section of a sealless pump having a third embodiment of the monitoring apparatus of the present invention associated therewith.
Figure 11:
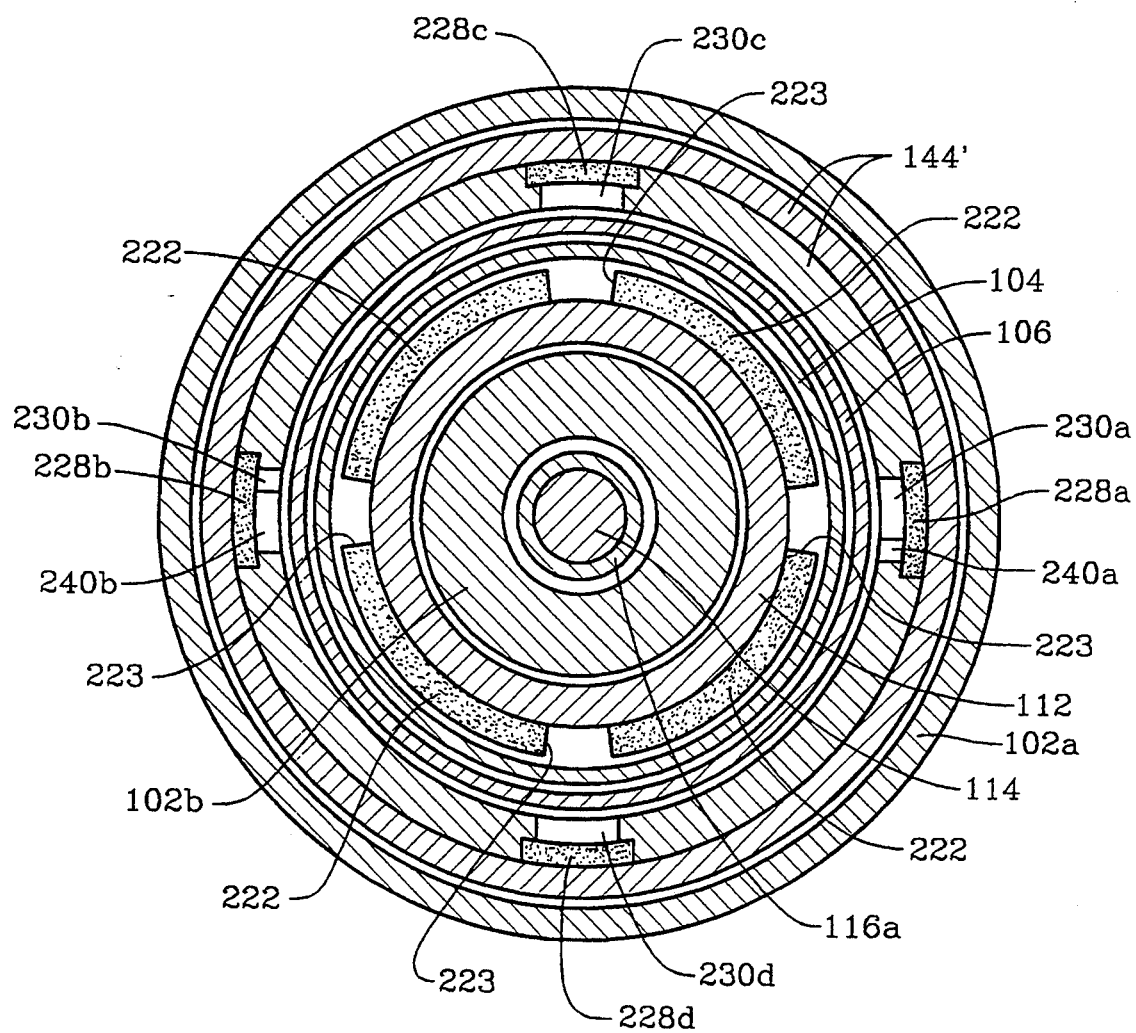
FIG. 11 is a cross-sectional view taken generally along section line 11—11 in FIG. 10 and including in cross-section the portion of the sealless pump not shown in FIG. 10.

A second alternative embodiment of the monitoring apparatus of the present invention is shown in FIGS. 10 and 11, where like reference numerals indicate like elements. This embodiment includes four magnetic material sections 222 having four notches 223 interposed therebetween and being positioned about the outer surface 112a of the inner support 112. Located within the sensor ring 144' are four magnets 228a–228d and four associated radial hall effect devices 230a–230d. Each radial hall effect device 230a–230d acts to sense magnetic flux density as the magnetic material 222 rotates thereby to generate a distance signal indicative of the distance separating the radial hall effect device and the driven magnet assembly 110.

The circuitry for comparing the distance signals generated by the radial hall effect devices 230a and 230b to determine radial bearing wear along a first axis which passes through the radial hall effect devices 230a and 230b and for comparing the distance signals generated by the radial hall effect devices 230c and 230d to determine radial bearing wear along a second axis which passes through the radial hall effect devices 230c and 230d comprises the circuitry of either monitoring apparatus 140 of FIG. 5 or monitoring apparatus 200 of FIG. 9.

For monitoring axial wear of the bearing means 116, first and second axial hall effect devices 240a and 240b, respectively, are mounted in the sensor ring 144'. The first axial hall effect device 240a is mounted on one side of a centerplane which passes through the center of the sensor ring 144'. Likewise, the second axial hall effect device 240b is mounted to a second side of the centerplane which passes through the center of the sensor ring 144'. The circuitry for comparing the signals output by the axial hall effect devices 240a and 240b and for generating a corresponding differential signal indicative of axial wear of the bearing means 116 comprises the circuitry of either the monitoring apparatus 140 of FIG. 5 or the monitoring apparatus 200 of FIG. 9.

To permit the direction of rotation of the driven magnet assembly 110 to be determined, the first axial hall effect device 240a is spaced a predetermined distance along the circumference of the sensor ring 144' from the first radial hall effect device 230a. Consequently, when one of the magnetic material sections 222 passes the two hall effect devices 240a and 230a when the driven magnet assembly 110 rotates in a first rotation direction, the signal generated by the axial hall effect device 240a leads the signal generated by the radial hall effect device 230a. When, on the other hand, the driven magnet assembly 110 rotates in a second, opposite rotation direction, the signal generated by the axial hall effect device 240a lags the signal generated by the radial hall effect device 230a. The circuitry for determining the sequence of the signals output by the axial hall effect device 240a and the radial hall effect device 230a and for generating a rotation direction signal which is indicative of the rotational direction of the driven magnet assembly 110 comprises the circuitry of either the monitoring apparatus 140 of FIG. 5 or the monitoring apparatus 200 of FIG. 9.

Having described the invention in detail and by reference to preferred embodiments thereof, it will be apparent that modifications and variations are possible without departing from the scope of the invention defined in the appended claims.

What is claimed is:

1. An apparatus for monitoring a rotor within a stationary housing including bearing means for mounting said rotor for rotation about a rotor axis, said apparatus comprising:

at least one magnet mounted about the circumference of said rotor;

first radial hall effect means fixedly mounted in said housing radially adjacent to the circumference of said rotor for sensing magnetic flux density as said at least one magnet passes thereby and for generating a first distance signal representative of the distance separating said first radial hall effect means and said rotor in response to said magnetic flux density;

second radial hall effect means fixedly mounted in said housing radially adjacent to the circumference of said rotor for sensing magnetic flux density as said at least one magnet passes thereby and for generating a second distance signal representative of the distance separating said second radial hall effect means and said rotor in response to said magnetic flux density;

third radial hall effect means fixedly mounted in said housing radially adjacent to the circumference of said rotor for sensing magnetic flux density as said at least one magnet passes thereby and for generating a third distance signal representative of the distance separating said third radial hall effect means and said rotor in response to said magnetic flux density;

fourth radial hall effect means fixedly mounted in said housing radially adjacent to the circumference of said rotor for sensing magnetic flux density as said at least one magnet passes thereby and for generating a fourth distance signal representative of the distance separating said fourth radial hall effect means and said rotor in response to said magnetic flux density, said first, second, third and fourth radial hall effect means being spaced substantially equidistantly about a circumferential portion of said housing; and signal comparison means for comparing said first and second distance signals to one another to generate a first comparison signal which is representative of the difference between the distance separating said first radial hall effect means and said rotor and the distance separating said second radial hall effect means and said rotor, for comparing said third and fourth distance signals to one another to generate a second comparison signal which is representative of the difference between the distance separating said third radial hall effect means and said rotor and the distance separating said fourth radial hall effect means and said rotor, said first comparison signal being representative of radial wear of said bearing means along a first axis which passes through said first and second radial hall effect means and said second comparison signal being representative of radial wear of said bearing means along a second axis which passes through said third and fourth radial hall effect means, said first and second axes being substantially perpendicular to one another and defining a plane which is substantially perpendicular to said rotor axis, said signal comparison means further generating a resultant wear signal indicative of resultant radial wear of said bearing means by taking the square root of the sum of the squares of said first and second comparison signals.

2. An apparatus for monitoring a rotor as set forth in claim 1, wherein said signal comparison means comprises:
   first differential amplifier means for comparing said first and second distance signals to one another to generate said first comparison signal;
   second differential amplifier means for comparing said third and fourth distance signals to one another to generate said second comparison signal; and
   circuit means for generating said resultant wear signal by taking the square root of the sum of the squares of said first and second comparison signals.

3. An apparatus for monitoring a rotor as set forth in claim 1, wherein said signal comparison means comprises a programmable processor.

4. An apparatus for monitoring a rotor as set forth in claim 3, further comprising temperature sensing means for sensing the temperature of said containment shell, and said processor is coupled to said temperature sensing means for monitoring the temperature of said containment shell.

5. An apparatus for monitoring a rotor as set forth in claim 3, further comprising power level sensing means for sensing the electrical power driving said pump, and said processor is coupled to said power level sensing means for monitoring said electric power.

6. An apparatus for monitoring a rotor within a stationary housing, said stationary housing including bearing means for mounting said rotor for rotation about a rotor axis, said apparatus comprising:
   at least one magnet mounted about the circumference of said rotor;
   first radial hall effect means fixedly mounted in said housing radially adjacent to the circumference of said rotor for sensing magnetic flux density through said containment shell as said at least one magnet passes thereby and for generating a first distance signal representative of the distance separating said first radial hall effect means and said rotor in response to said magnetic flux density;
   second radial hall effect means fixedly mounted in said housing radially adjacent to the circumference of said rotor for sensing magnetic flux density through said containment shell as said at least one magnet passes thereby and for generating a second distance signal representative of the distance separating said second radial hall effect means and said rotor in response to said magnetic flux density;
   third radial hall effect means fixedly mounted in said housing radially adjacent to the circumference of said rotor for sensing magnetic flux density through said containment shell as said at least one magnet passes thereby and for generating a third distance signal representative of the distance separating said third radial hall effect means and said rotor in response to said magnetic flux density;
   fourth radial hall effect means fixedly mounted in said housing radially adjacent to the circumference of said rotor for sensing magnetic flux density through said containment shell as said at least one magnet passes thereby and for generating a fourth distance signal representative of the distance separating said fourth radial hall effect means and said rotor in response to said magnetic flux density;
   first axial hall effect means fixedly mounted in said housing radially adjacent to the circumference of said rotor and spaced a defined distance on one side of said plane for generating a first axial signal as said at least one magnet passes thereby;
   second axial hall effect means fixedly mounted in said housing radially adjacent to the circumference of said rotor and spaced a defined distance on a side opposite to said one side of said plane for generating a second axial signal as said at least one magnet passes thereby; and,
   signal comparison means for comparing said first and second distance signals to one another to generate a first comparison signal which is representative of the difference between the distance separating said first radial hall effect means and said rotor and the distance separating said second radial hall effect means and said rotor, said first comparison signal being representative of radial wear of said bearing means along a first axis which passes through said first and second radial hall effect means, for comparing said third and fourth distance signals to one another to generate a second comparison signal which is representative of the difference between the distance separating said third radial hall effect means and said rotor and the distance separating said fourth radial hall effect means and said rotor, said second comparison signal being representative of radial wear of said bearing means along a second axis which passes through said third and fourth radial hall effect means, and for comparing said first and second axial signals to one another to generate an axial wear signal which is indicative of axial wear for said bearing means.

7. An apparatus for monitoring a rotor as set forth in claim 6, wherein said signal comparison means comprises:
   first differential amplifier means for comparing said first and second distance signals to one another to generate said first comparison signal;
   second differential amplifier means for comparing said third and fourth distance signals to one another to generate said second comparison signal;
   circuit means for generating a resultant wear signal by taking the square root of the sum of the squares of said first and second comparison signals; and,
   axial differential amplifier means for generating said axial wear signal by comparing said first and second axial signals to one another.

8. An apparatus for monitoring a rotor as set forth in claim 6, wherein said signal comparison means comprises a programmable processor.

9. An apparatus for monitoring a rotor as set forth in claim 6, wherein said housing includes a circumferential portion which is coaxial with said rotor and has said first, second, third and fourth radial hall effect means and said first and second axial hall effect means mounted thereto.

10. An apparatus for monitoring a rotor as set forth in claim 9, wherein said first axial hall effect means is spaced a predetermined distance along the circumference of said circumferential portion from said first radial hall effect means such that said first axial signal leads said first distance signal when said rotor rotates in a first rotation direction, and said first axial signal lags said first distance signal when said rotor rotates in a second, opposite rotation direction, and said signal comparison means further provides for generating a rotation direction signal based upon the sequence in which said first axial signal and said first distance signal are generated.

11. An apparatus for monitoring a rotor within a stationary housing including bearing means for mounting said rotor for rotation about a rotor axis, said apparatus comprising;
  first, second, third and fourth magnets fixedly mounted within said housing;
  magnetic material means mounted on the circumference of said rotor for acting with said first, second, third and fourth magnets to conduct magnetic flux which passes between said rotor and said housing;
  first radial hall effect means fixedly mounted in said housing adjacent to said first magnet and radially adjacent to the circumference of said rotor for sensing magnetic flux density when said magnetic material means is positioned radially adjacent thereto and for generating a first distance signal representative of the distance separating said first radial hall effect means and said rotor in response to said magnetic flux density;
  second radial hall effect means fixedly mounted in said housing adjacent to said second magnet and radially adjacent to the circumference of said rotor for sensing magnetic flux density when said magnetic material means is positioned radially adjacent thereto and for generating a second distance signal representative of the distance separating said second radial hall effect means and said rotor in response to said magnetic flux density;
  third radial hall effect means fixedly mounted in said housing adjacent to said third magnet and radially adjacent to the circumference of said rotor for sensing magnetic flux density when said magnetic material means is positioned radially adjacent thereto and for generating a third distance signal representative of the distance separating said third radial hall effect means and said rotor in response to said magnetic flux density;
  fourth radial hall effect means fixedly mounted in said housing adjacent to said fourth magnet and radially adjacent to the circumference of said rotor for sensing magnetic flux density when said magnetic material means is positioned radially adjacent thereto and for generating a fourth distance signal representative of the distance separating said fourth radial hall effect means and said rotor in response to said magnetic flux density, said first, second, third and fourth radial hall effect means being spaced substantially equidistantly about a circumferential portion of said housing; and
  signal comparison means for comparing said first and second distance signals to one another to generate a first comparison signal which is representative of the difference between the distance separating said first radial hall effect means and said rotor and the distance separating said second radial hall effect means and said rotor, for comparing said third and fourth distance signals to one another to generate a second comparison signal which is representative of the difference between the distance separating said third radial hall effect means and said rotor and the distance separating said fourth radial hall effect means and said rotor, said first comparison signal being representative of radial wear of said bearing means along a first axis which passes through said first and second radial hall effect means and said second comparison signal being representative of radial wear of said bearing means along a second axis which passes through said third and fourth radial hall effect means, said first and second axes being substantially perpendicular to one another and defining a plane which is substantially perpendicular to said rotor axis, said signal comparison means further generating a resultant wear signal indicative of resultant radial wear of said bearing means by taking the square root of the sum of the squares of said first and second comparison signals.

12. An apparatus for monitoring a rotor as set forth in claim 11, wherein said signal comparison means comprises:
  first differential amplifier means for comparing said first and second distance signals to one another to generate said first comparison signal;
  second differential amplifier means for comparing said third and fourth distance signals to one another to generate said second comparison signal; and
  circuit means for generating said resultant wear signal by taking the square root of the sum of the squares of said first and second comparison signals.

13. An apparatus for monitoring a rotor as set forth in claim 11, wherein said signal comparison means comprises a programmable processor.

14. An apparatus for monitoring a rotor within a stationary housing, said stationary housing including bearing means for mounting said rotor for rotation about a rotor axis said apparatus comprising:
  first, second, third and fourth magnets fixedly mounted within said housing;
  magnetic material means mounted on the circumference of said rotor for acting with said first, second third and fourth magnets to conduct magnetic flux which passes between said rotor and said housing;
  first radial hall effect means fixedly mounted in said housing adjacent to said first magnet and radially adjacent to the circumference of said rotor for sensing magnetic flux density when said magnetic material means is positioned radially adjacent thereto and for generating a first radial hall effect means of the distance separating said first radial hall effect means and said rotor in response to said magnetic flux density;
  second radial hall effect means fixedly mounted in said housing adjacent to said second magnet and radially adjacent to the circumference of said rotor for sensing magnetic flux density when said magnetic material means is positioned radially adjacent thereto and for generating a second distance signal representative of the distance separating said second radial hall effect means and said rotor in response to said magnetic flux density;

third radial hall effect means fixedly mounted in said housing adjacent to said third magnet and radially adjacent to the circumference of said rotor for sensing magnetic flux density when said magnetic material means is positioned radially adjacent thereto and for generating a third distance signal representative of the distance separating said third radial hall effect means and said rotor in response to said magnetic flux density;

fourth radial hall effect means fixedly mounted in said housing adjacent to said fourth magnet and radially adjacent to the circumference of said rotor for sensing magnetic flux density when said magnetic material means is positioned radially adjacent thereto and for generating a fourth distance signal representative of the distance separating said fourth radial hall effect means and said rotor in response to said magnetic flux density;

first axial hall effect means fixedly mounted in said housing adjacent to said first magnet, radially adjacent to the circumference of said rotor and spaced a defined distance on one side of said plane for sensing magnetic flux density when said magnetic material means is positioned adjacent thereto and for generating a first axial signal in response to sensing said magnetic flux density;

second axial hall effect means fixedly mounted in said housing adjacent to said second magnet, radially adjacent to the circumference of said rotor and spaced a defined distance on a side opposite to said one side of said plane for sensing magnetic flux density when said magnetic material means is positioned adjacent thereto and for generating a second axial signal in response to sensing said magnetic flux density; and, signal comparison means for comparing said first and second distance signals to one another to generate a first comparison signal which is representative of the difference between the distance separating said first radial hall effect means and said rotor and the distance separating said second radial hall effect means and said rotor, said first comparison signal being representative of radial wear of said bearing means along a first axis which passes through said first and second radial hall effect means, for comparing said third and fourth distance signals to one another to generate a second comparison signal which is representative of the difference between the distance separating said third radial hall effect means and said rotor and the distance separating said fourth radial hall effect means and said rotor, said second comparison signal being representative of radial wear of said bearing means along a second axis which passes through said third and fourth radial hall effect means, and for comparing said first and second axial signals to one another to generate an axial wear signal which is indicative of axial wear for said bearing means.

15. An apparatus for monitoring a rotor as set forth in claim 14, wherein said housing includes a circumferential portion which is coaxial with said rotor and has said first, second, third and fourth radial hall effect means and said first and second axial hall effect means mounted thereto.

16. An apparatus for monitoring a rotor as set forth in claim 15, wherein said magnetic material means comprises magnetic material mounted about the circumference of said rotor and including a notch therein;

said first axial hall effect means generating said first axial signal after said notch passes thereby and said first radial hall effect means generating said first distance signal after said notch passes thereby; and said first axial hall effect means is spaced a predetermined distance along the circumference of said circumferential portion from said first radial hall effect means such that said first axial signal leads said first distance signal when said rotor rotates in a first rotation direction, and said first axial signal lags said first distance signal when said rotor rotates in a second, opposite rotation direction, and said signal comparison means further providing for generating a rotation direction signal based upon the sequence in which said first axial signal and said first distance signal are generated.

* * * * *

UNITED STATES PATENT AND TRADEMARK OFFICE
CERTIFICATE OF CORRECTION

PATENT NO. : 5,336,996
DATED : August 9, 1994
INVENTOR(S) : Dennis M. Rusnak

It is certified that error appears in the above-indentified patent and that said Letters Patent is hereby corrected as shown below:

Col. 20, lines 56 and 57,      "radial hall effect means" should read --distance signal representative--.

Signed and Sealed this

Fourth Day of October, 1994

Attest:

BRUCE LEHMAN

Attesting Officer      *Commissioner of Patents and Trademarks*